US00RE46207E

(19) United States
(12) Reissued Patent
Brede et al.

(10) Patent Number: US RE46,207 E
(45) Date of Reissued Patent: Nov. 22, 2016

(54) MAGNETIC SEPARATION APPARATUS

(71) Applicant: LIFE TECHNOLOGIES AS, Carlsbad, CA (US)

(72) Inventors: Gaute Brede, Ranheim (NO); Darren Ellis, Lommedalen (NO); Tine Hildisch, Oslo (NO); Jeremy ("Jez") Mundy, Fairford (GB); Lars Nokleby, Stabekk (NO); Erlend Ragnhildstveit, Oslo (NO); Richard Toften, Paradis (NO); Kornelija Zgonc, Carlsbad, CA (US)

(73) Assignee: LIFE TECHNOLOGIES AS, Oslo (NO)

(21) Appl. No.: 29/454,427

(22) Filed: May 9, 2013

Related U.S. Patent Documents

Reissue of:
(64) Patent No.: Des. 637,709
Issued: May 10, 2011
Appl. No.: 29/305,042
Filed: Mar. 12, 2008

(51) LOC (10) Cl. ..... 24-02
(52) U.S. Cl.
USPC ..... D24/107
(58) Field of Classification Search
USPC ..... D24/107, 108; 210/222, 232, 695, 210/223.1; 422/101, 104, 527
See application file for complete search history.

(56) References Cited

U.S. PATENT DOCUMENTS

| | | | | |
|---|---|---|---|---|
| 4,895,650 | A | 1/1990 | Wang | |
| 5,567,326 | A * | 10/1996 | Ekenberg et al. | 210/695 |
| 6,123,205 | A | 9/2000 | Dumitrescu et al. | |
| 6,193,892 | B1 * | 2/2001 | Krueger et al. | 210/695 |
| 6,562,239 | B2 * | 5/2003 | Foy et al. | 210/695 |

(Continued)

FOREIGN PATENT DOCUMENTS

| | | |
|---|---|---|
| EM | 000788799-0001 | 9/2007 |
| EM | 000788799-0002 | 9/2007 |

(Continued)

*Primary Examiner* — Phillip S Hyder
(74) *Attorney, Agent, or Firm* — Michael J. Smith

(57) CLAIM

The ornamental design for a magnetic separation apparatus, as shown and described.

DESCRIPTION

[FIG. 1 is a top perspective view of an embodiment;]
[FIG. 2 is a side view of an embodiment;]
[FIG. 3 is a side view of an embodiment;]
[FIG. 4 is a side perspective view of an embodiment; and,]
[FIG. 5 is a side perspective view of an embodiment where two of the pieces have been separated.]
[No color is claimed as part of the design, nor are any logos, and/or written matter claimed as part of the design.]
*FIG. 1 is a top front and right side perspective view of a magnetic separation apparatus, showing my new design;*
*FIG. 2 is a cross section view taken along the line 2-2 of FIG. 1;*
*FIG. 3 is a side elevation view thereof;*
*FIG. 4 is a top front and left side perspective view thereof; and,*
*FIG. 5 is a top front and left side perspective view thereof wherein the components of the design are separated.*
*The broken lines depict portions of the magnetic separation apparatus in which the design is embodied that are not considered part of the claim design.*

1 Claim, 4 Drawing Sheets

Matter enclosed in heavy brackets [ ] appears in the original patent but forms no part of this reissue; matter printed in italics indicates the additions made by reissue.

(56) References Cited

U.S. PATENT DOCUMENTS 7,740,759 B2 * 6/2010 Su et al. ..... 210/222
7,829,026 B2 * 11/2010 Su et al. ..... 422/527

FOREIGN PATENT DOCUMENTS

EM 000788799-0003 9/2007
EM 000788799-0004 9/2007

* cited by examiner

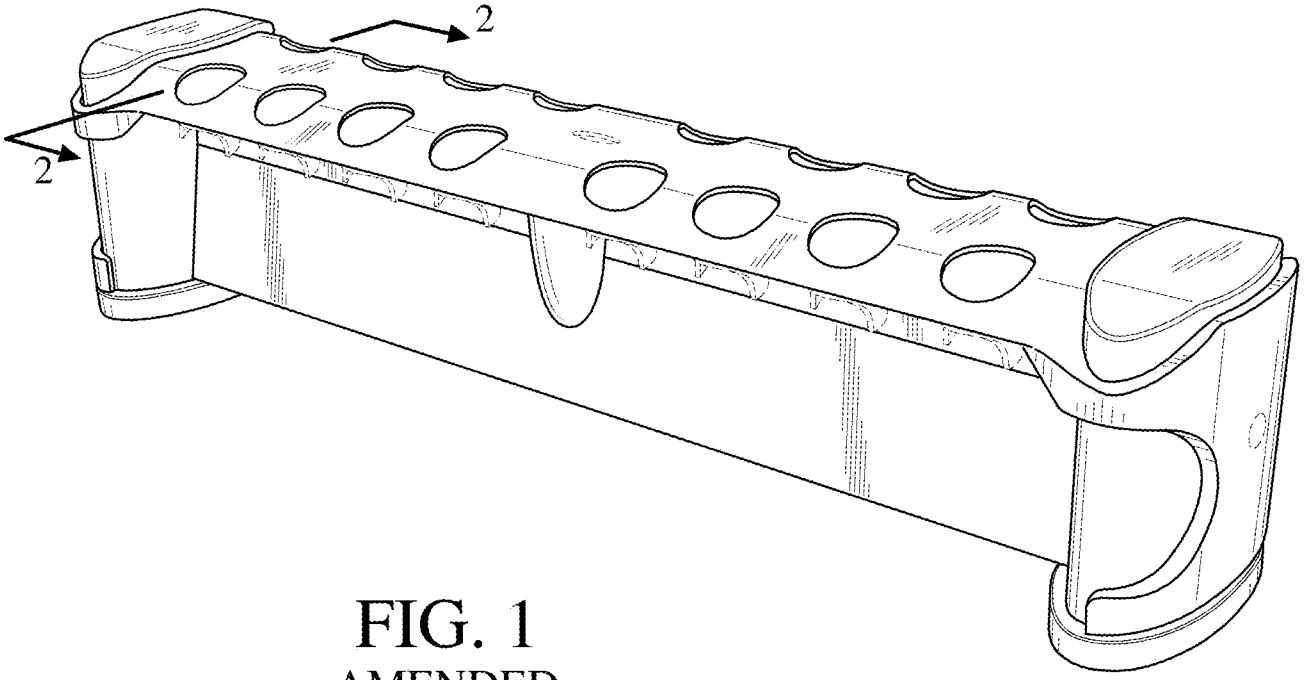
FIG. 1
AMENDED

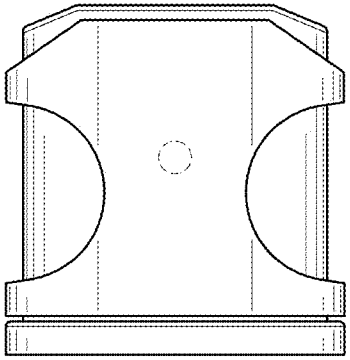
FIG. 3
AMENDED
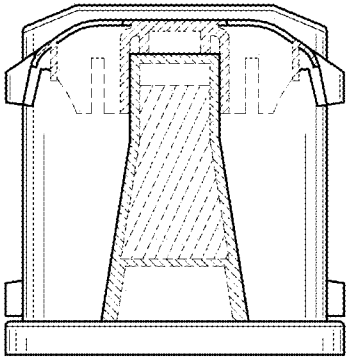
FIG. 2
AMENDED

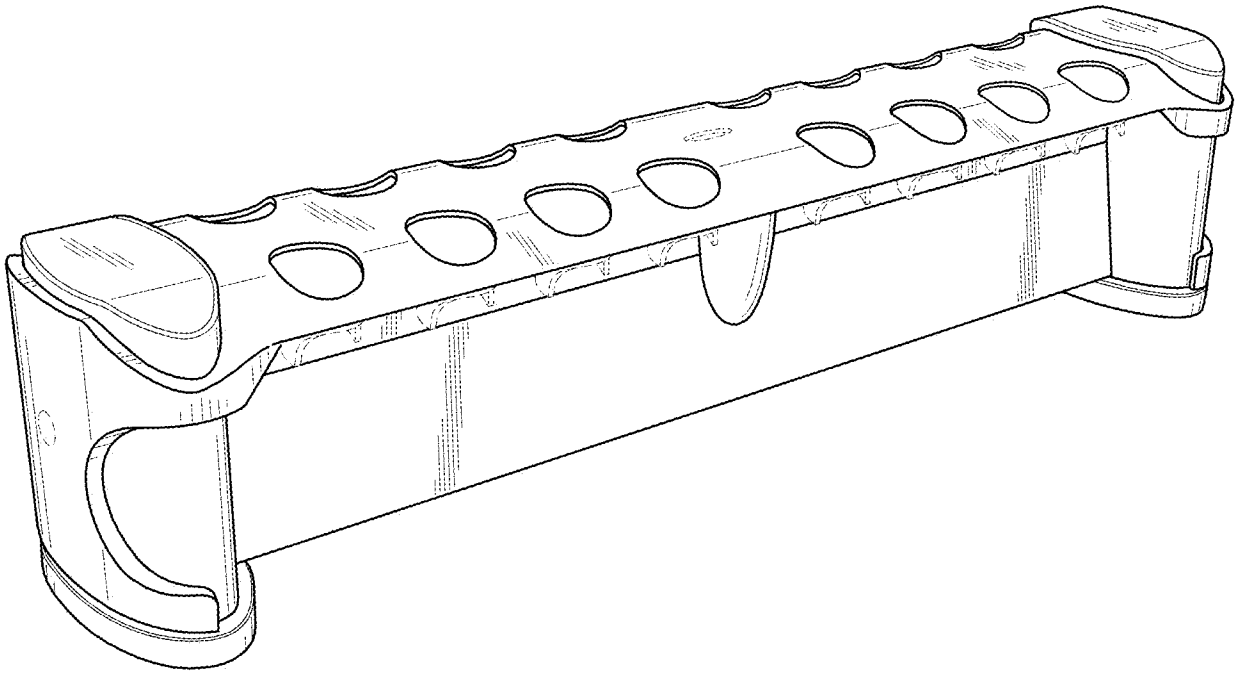
FIG. 4
AMENDED

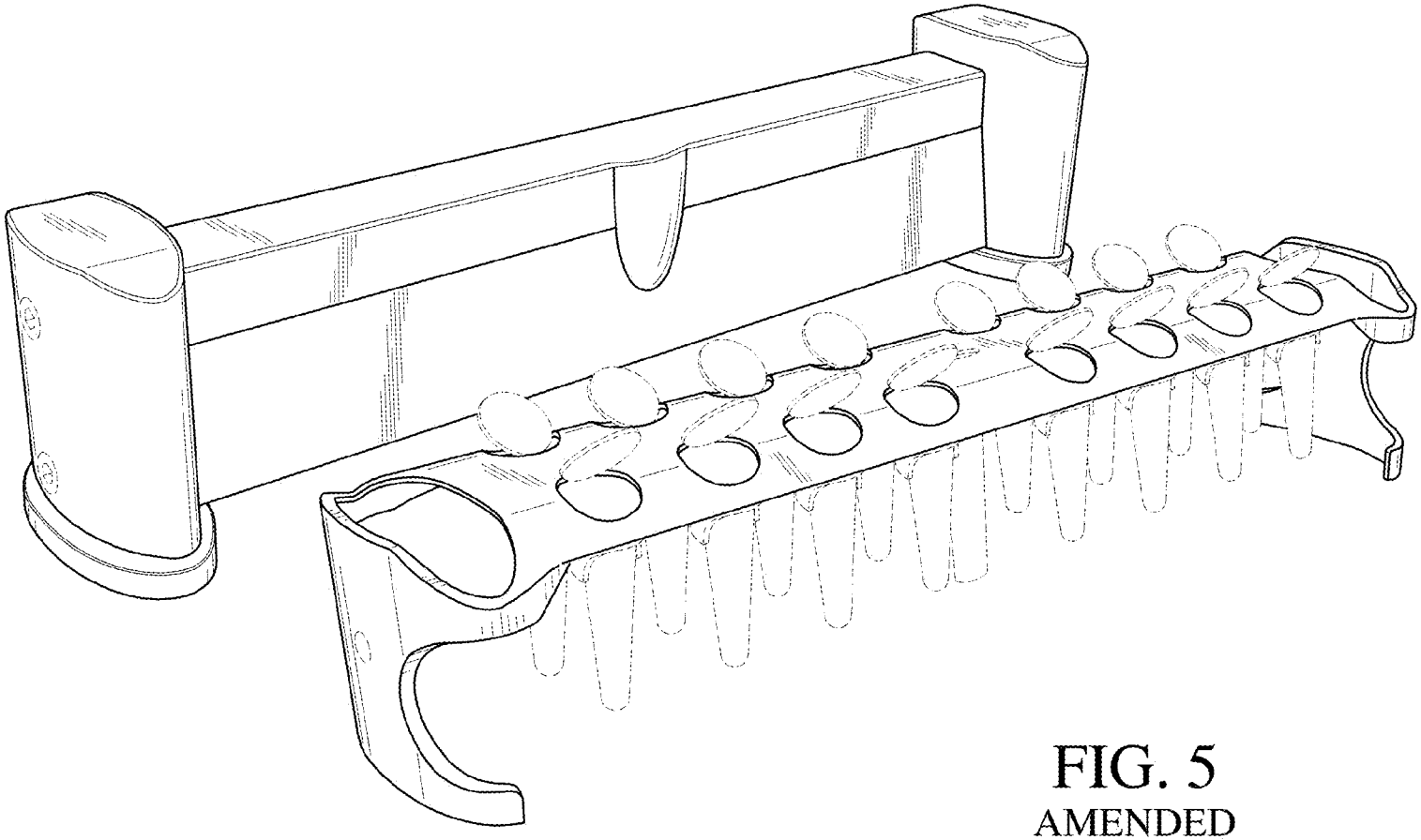
FIG. 5
AMENDED